United States Patent
Mallinger et al.

(10) Patent No.: US 9,371,052 B2
(45) Date of Patent: Jun. 21, 2016

(54) AIRBAG MODULE WITH EXTERNAL DEFLECTOR

(71) Applicant: Key Safety Systems, Inc., Sterling Heights, MI (US)

(72) Inventors: Heather Mallinger, Shelby Township, MI (US); Calum Beattie, Rochester Hills, MI (US); Roy Deutschmann, South Lyon, MI (US); Alberto Rodrigues, Rochester Hills, MI (US); Joseph Massa, Rochester Hills, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 14/414,935

(22) PCT Filed: Jul. 18, 2013

(86) PCT No.: PCT/US2013/051021
§ 371 (c)(1),
(2) Date: Jan. 15, 2015

(87) PCT Pub. No.: WO2014/015108
PCT Pub. Date: Jan. 23, 2014

(65) Prior Publication Data
US 2015/0166001 A1 Jun. 18, 2015

Related U.S. Application Data

(60) Provisional application No. 61/673,138, filed on Jul. 18, 2012.

(51) Int. Cl.
*B60R 21/16* (2006.01)
*B60R 21/201* (2011.01)
*B60R 21/205* (2011.01)
*B60R 21/2338* (2011.01)

(52) U.S. Cl.
CPC ............. *B60R 21/201* (2013.01); *B60R 21/205* (2013.01); *B60R 2021/161* (2013.01); *B60R 2021/23386* (2013.01)

(58) Field of Classification Search
CPC B60R 21/201; B60R 21/216; B60R 21/2338; B60R 2021/23384
USPC .................. 280/743.1, 728.2, 728.3, 731, 732
See application file for complete search history.

(56) References Cited

U.S. PATENT DOCUMENTS

| | | | | |
|---|---|---|---|---|
| 5,004,266 | A * | 4/1991 | Miller | B60R 21/201 280/743.2 |
| 5,385,366 | A | 1/1995 | Frank | |
| 6,070,904 | A * | 6/2000 | Ozaki | B60R 21/16 280/728.1 |
| 6,371,510 | B1 * | 4/2002 | Marriott | B60R 21/201 280/730.1 |
| 7,021,653 | B2 * | 4/2006 | Burdock | B60R 21/201 280/730.1 |
| 7,396,044 | B2 * | 7/2008 | Bauer | B60R 21/201 280/728.1 |
| 7,722,077 | B2 * | 5/2010 | Dietze | B60H 1/0055 280/728.2 |
| 7,748,739 | B2 * | 7/2010 | Brinker | B60R 21/231 280/742 |

(Continued)

FOREIGN PATENT DOCUMENTS

DE 102010051421 A1 5/2012

*Primary Examiner* — Toan To
(74) *Attorney, Agent, or Firm* — Markell Seitzman

(57) ABSTRACT

An airbag module (400) has a housing (402), an airbag (404), an inflator (406) and a deflector mechanism (420) which provides a barrier or guide and a reaction hood 401 or surface to modify the trajectory of the airbag on inflation to inflate at a lower trajectory. The deflector mechanism (420) has a tensioning member (430).

20 Claims, 5 Drawing Sheets

(56) References Cited

U.S. PATENT DOCUMENTS

| | | | | |
|---|---|---|---|---|
| 7,770,925 B2* | 8/2010 | Seymour | ............... | B60R 21/201 280/728.2 |
| 7,845,672 B2* | 12/2010 | Onohara | ................. | B60R 21/20 280/728.2 |
| 8,272,664 B2* | 9/2012 | Benny | ................... | B60R 21/201 280/728.1 |
| 8,407,968 B2* | 4/2013 | Lachat | .................. | B60R 21/201 280/743.1 |
| 8,544,881 B2* | 10/2013 | Abele | ................... | B60R 21/205 280/728.1 |

* cited by examiner

US 9,371,052 B2

AIRBAG MODULE WITH EXTERNAL DEFLECTOR

BACKGROUND AND SUMMARY OF THE INVENTION

The present invention relates generally to airbags and more specifically to an apparatus for changing the trajectory of an inflating airbag to reduce the impact force of the airbag upon the windshield.

FIG. 1 diagrammatically illustrates a typical passenger compartment 20 of a vehicle showing opposing A-pillars 22, a windshield 24 and instrument panel 26. Situated on the top 28 surface of the instrument panel is a deployment door 30. The windshield is oriented relative to the top surface at an angle A which varies from about 20 degrees to 60 degrees. The door 30 is part of an instrument panel. Situated below the instrument panel is an airbag module 40 of known variety comprising: an airbag 42, an inflator 44 and a housing 46. The door 30 is capable of being separated from the rest of the instrument panel 26 upon deployment/inflation of airbag 42. Typically a plurality of stress risers or a weakened portion or tear seam 56 is fabricated in the instrument panel about the door 30. These stress risers/weakened portion/tear seam 56 are designed to rupture permitting the door to rotate toward the instrument panel, as illustrated in FIG. 2. As the door moves, the airbag 42 continues to inflate. This operation is designed to occur at the modest level of airbag internal pressure. The stress risers or tear seam 56 are designed to break at a modest internal airbag pressure to prevent propellant of the deployment for forcefully against the windshield.

Occasionally the weakened portions 56 do not break as designed, consequently, the airbag 42 will continue to inflate and press upon the underside of the door 30 with increasing force. When the weakened portions 56 finally break, the airbag 42 deploys outwardly with great force and the airbag 42 and door 30 are pushed against the windshield with an impulsive force F1 which can be sufficiently high to crack the windshield.

It is an object of the present invention to correct the deficiencies in the prior art.

DETAILED DESCRIPTION OF THE DRAWINGS

Figure 1:
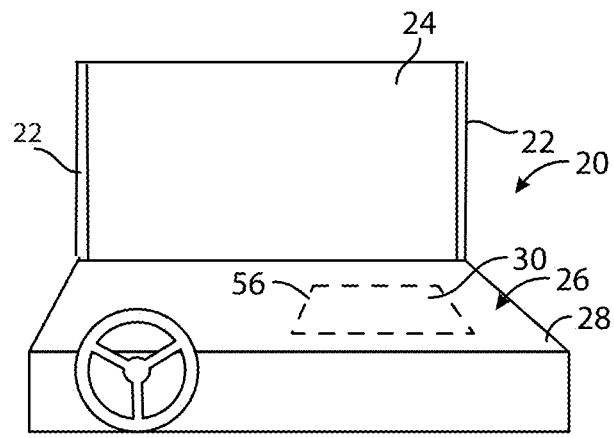
FIG. 1 diagrammatically illustrates a typical windshield and instrument panel of the vehicle.
Figure 2:
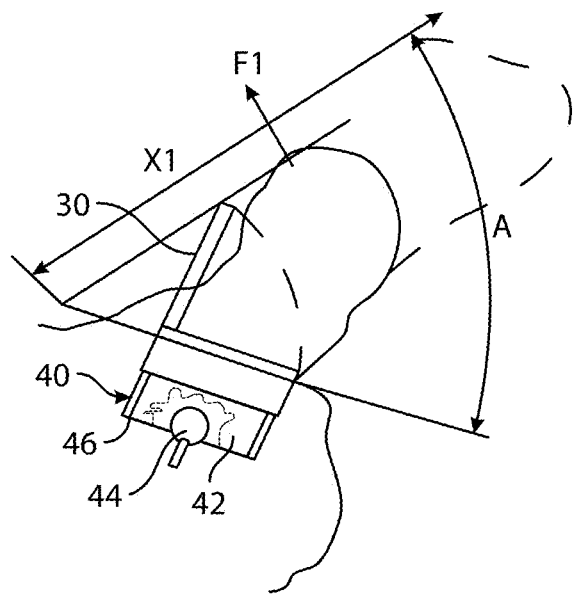
FIG. 2 is a cross-sectional view showing an inflating passenger side airbag.
Figure 3:
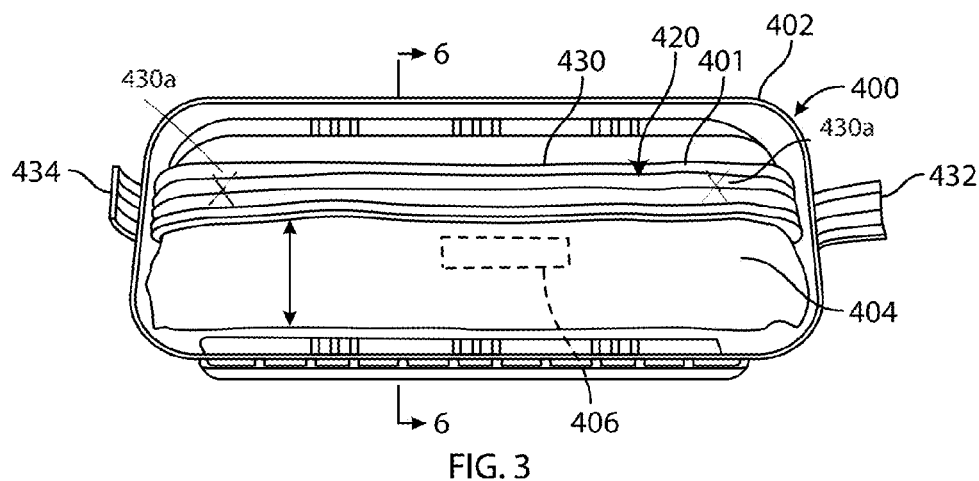
FIG. 3 illustrates one embodiment of the present invention.

Reference is made to FIG. 3 which illustrates an airbag module 400 of the present invention comprising a housing 402, airbag 404 and inflator 406. In general terms, this portion of the invention is rather conventional. Module 400 further includes a deflector mechanism 420 which provides a barrier or guide as well as a reaction hood or surface to modify the trajectory of the inflating airbag so the airbag tends to inflate at a lower expanding trajectory than without the barrier or guide. This trajectory correction discourages the airbag from impacting the windshield at the lower portions of the windshield thereby lessening the applied force to the windshield and reducing the risk of windshield damage. In a first embodiment of the invention the deflector mechanism comprises a tensioning member 430, which in the first illustrated embodiment is configured as a length of seat belt webbing, or similar band, 430a secured to a reaction hood 401. In other embodiments the tensioning member is formed by overlapping layers of the reaction hood or alternatively by wires or ropes secured to the reaction hood. As will be seen below, the reaction hood 401 partially covers the folded airbag 404 preventing the airbag from deploying forward of the tensioning member 430 (that is closer to the windshield), for example see FIGS. 3, 7 and 8. The tensioning member 430 includes opposing ends at 432 and 434 that are secured to housing 402. In the embodiment illustrated in FIG. 3, for example, the ends 432 and 434 are secured to sides 436 of the housing. Only one side 436 of the housing is visible in FIG. 4. The tensioning member 430 is secured to a top portion of the reaction hood 401 by a suitable means. In the illustrated embodiment the tensioning belt 430a is secured by stitches to the reaction hood 401.

Figure 4:
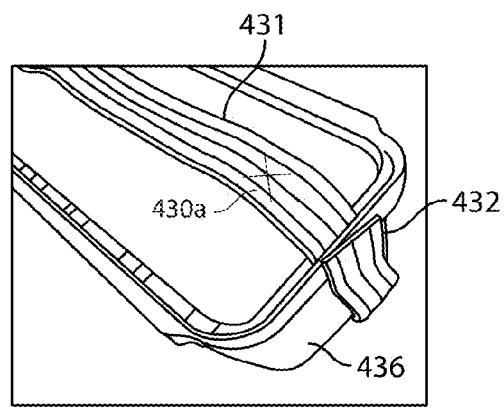
FIG. 4 illustrates a close-up view of the external tether.
Figure 5A:
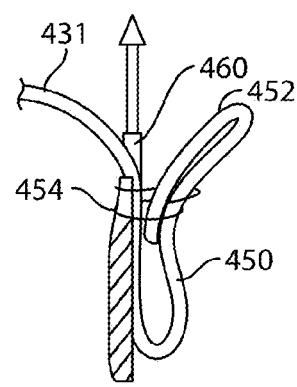
FIGS. 5A-5D show various ways of connecting the external tether to the airbag module housing.
Figures 5B, 5C, 5D:
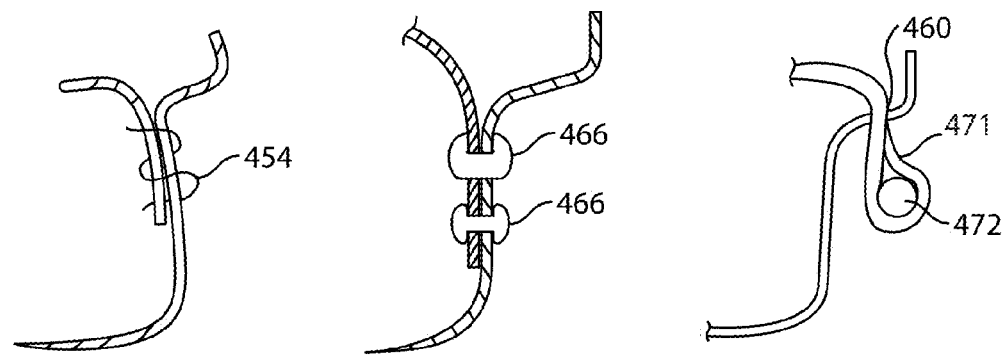

The respective ends 432 and 434 of the tensioning belt can be attached to the housing in a variety of ways, see FIGS. 5A-5D. As illustrated in FIG. 4, as well as in FIG. 5A, each end of the webbing 432,434 is formed into a loop 450 with an extending member or arm 452. The end of the webbing is folded onto itself and sewn together to form the loop. Numeral 454 shows the sewing threads. The webbing loop is pulled through a hole 460 formed on the housing at any convenient location, for example, on the side or on a horizontal lip. The center portion 431 of tensioning member 430 and the extending member 452 provide a barrier to keep the webbing in place. FIG. 5B shows an alternate method of securing the webbing 430 to the housing 402. If housing 402 is plastic the webbing can be sewn to the plastic housing, for example, at its sides. In FIG. 5C the webbing 430 is secured to the housing by rivets 466. In FIG. 5D the ends of the webbing are formed into a loop 471; a pin 472 is inserted within the loop. The diameter of the loop, with the pin in place, is designed to be wider than the hole 460 in the housing. Other attachment mechanisms are within the spirit of the present invention.

Figure 6:
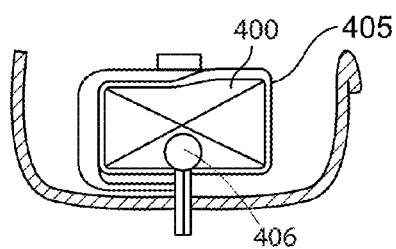
FIG. 6 is a cross-sectional view taken through section 6-6 of FIG. 3.

Reference is made to FIGS. 6-9. FIG. 6 is a cross-sectional view of module 400 taken through section line 6-6 of FIG. 3. In FIG. 6, inflator 406 has been placed within airbag 400 in a conventional manner and then the airbag is folded into a compact configuration. As is well known in the art the folded airbag is kept in this configuration by enveloping the airbag with a lightweight, tearable cover 405 which covers all of the multiple sides and ends of the folded airbag.

Figure 7:
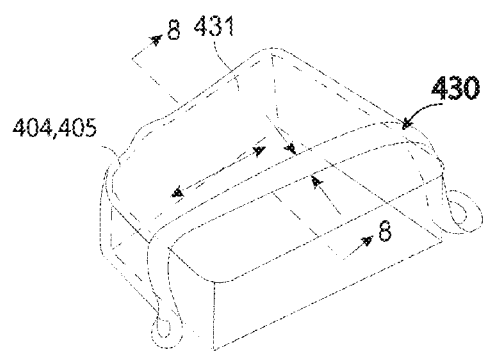
FIG. 7 diagrammatically illustrates an external deflector.

FIG. 7 shows the tensioning member 430 secured to the reaction hood 431, the folded airbag, with its cover 405 protectively enveloping the airbag, with its inflator 406 positioned therein, and is slid partially into the reaction hood 431.

Figure 8:
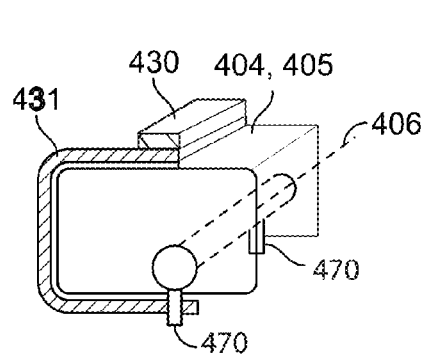
FIG. 8 is a cross-sectional view showing a deflector, airbag and inflator.

This configuration is shown in FIG. 7 with a portion of the folded airbag 404 and its hood 405 extending outwardly from the tensioning member 430, which in essence defines the outward edge of the reaction hood 431. Reference is also briefly made to FIG. 8 which is a cross-sectional view taken through section line 8-8 of FIG. 7. The relationship amongst the airbag 404, cover 405, reaction hood 431 and the tensioning member 430 is illustrated.

Figure 9:
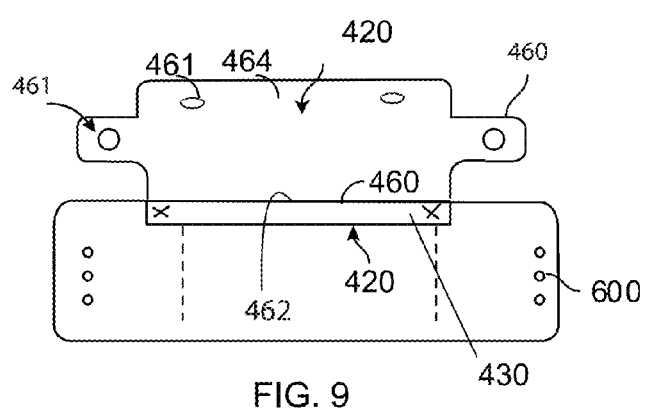
FIG. 9 is a plan view of the component parts of an external deflector.

FIG. 9 is an isolated view of deflector 420 illustrating the tensioning member 430 and the reaction hood 431 laid flat. The reaction hood includes a plurality of opposing extending legs 460, each of which includes a mounting hole 461. An edge portion 462 of hood 431 is positioned below the tensioning member or belt which forms the front of the deflector 420. Located opposite edge portion 462 is a generally rectangular shaped portion 464 having mounting holes 461. With hood 431 placed atop the folded airbag, legs 460 are pulled down so that mounting openings 461 can be placed about the mounting studs 470 of inflator 406. This movement covers the right and left sides or ends of the folded airbag. Subsequently, portion 464 of the hood is moved downwardly so that mounting holes 461 can also be secured to the studs 470. This motion moves the hood 431 into a covering condition over the rear of the top of the airbag, the rear side or surface of the folded airbag, and the rear portions of the bottom section of the folded airbag. When this subassembly, as illustrated in FIG. 8, is inserted within housing 402 the reaction hood is secured in place, once the inflator is secured by additional fasteners to the housing.

Figure 12:
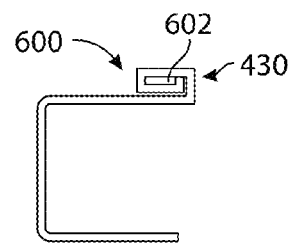
FIG. 12 shows an alternate embodiment of the invention.
Figure 13:
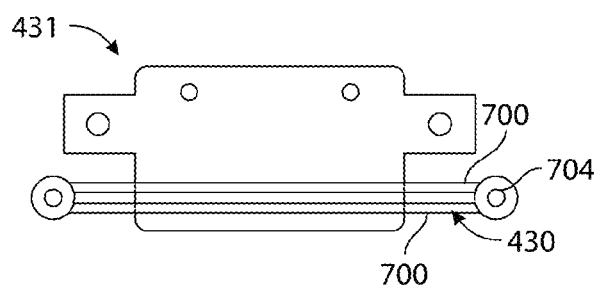
FIG. 13 shows a further embodiment of the invention.

Reference is briefly made to the phantom region 600 of FIG. 9 which identifies an alternate embodiment of the invention. This region 600 is an extension of the material used to form the reaction hood 431 and is used to replace the belt 430a used in the earlier embodiment. With the belt 430a removed from hood 431, the material of region 600 is folded back upon itself to create a number of folds 602 as illustrated in FIG. 12. This process creates an alternate tensioning member with sides 432 and 434. Reference is also made to FIG. 13 which illustrates a further embodiment in which the tensioning member 430 is formed by a plurality of wires or ropes 700 secured to a portion of hood 431. These wires or ropes can be terminated at a loop 704 which can be secured to the module housing or alternatively wrapped about the airbag and secured to the inflator mounting fasteners 470. This alternate mounting of the tensioning member is true of the belt 430a and the folded material 602.

Figure 10:
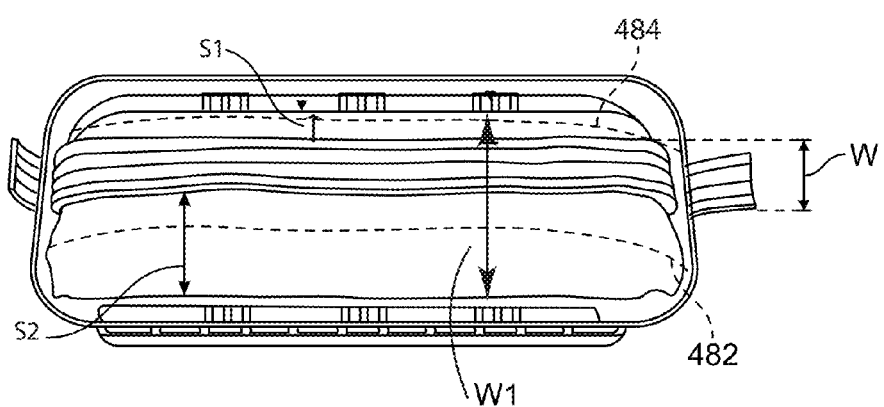
FIG. 10 is a top view showing an external deflector in an operative relationship to the folded airbag within the housing.

Reference is briefly made to FIG. 10 which illustrates with phantom lines 484 and 482 to show the tensioning member 430 can be moved rearward, in relation to FIG. 10, to align with phantom line 484 or moved forward, in relation to FIG. 10, to align with phantom line 482. As can be appreciated the placement of the tensioning member affects the inflation trajectory of the airbag. Reference is again made to FIGS. 7 and 10. The width of the tensioning member 430 is shown by W; the width of the opening in the airbag housing is shown as W1. Dimension S1 is the distance between the rear surface of the tensioning strap and the rear of the mouth or opening of the housing while dimension S2 is the distance between the forward edge of the tensioning strap 430 and forward edge of the mouth of the housing 402. In the preferred embodiment of the invention the dimensions are as follows W=47 mm, W1=95 mm, S1=30 mm and S2=20 mm.

Figure 11:
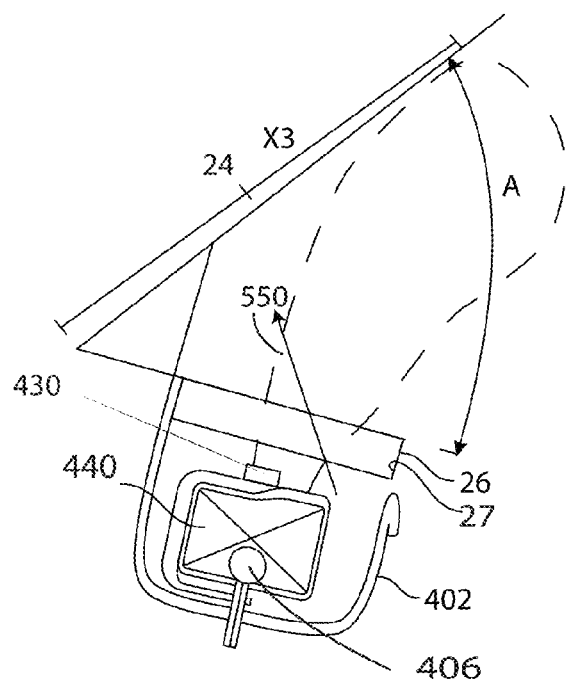
FIG. 11 shows the operation of the present invention.
Figure 14:
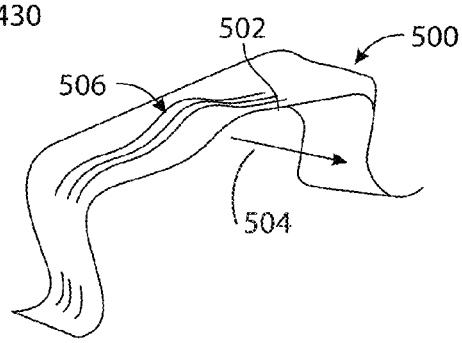
FIG. 14 shows a further embodiment of the invention.

FIG. 11 shows the present invention mounted in a typical instrument panel 26, the top of which is at an angle of A relative to windshield 24. Instrument panel 26 includes a recessed portion or chute 27 under which housing 402 is mounted. This mounting can be accomplished in any conventional matter. During an accident, a signal is generated which in turn causes inflator 406 to generate inflation gas which is communicated to the folded airbag 404. As the airbag inflates it breaks its cover 405 and creates a tension T across the tensioning belt 430 which stiffens the forward edge of the reaction hood 431. The reaction hood, as previously described, is also affixed to the inflator 406 and with the tensioning member in tension, the reaction hood acts as a reaction surface, which prevents forward movement of the air bag 404 in the forward direction of 550, that is toward the windshield. The inflating airbag 404 reacts against the reaction hood and exits from the instrument panel with a component of rearward momentum adding more tangential angle to the windshield, lessening impact with the windshield. The tensioned tensioning member 430 prevents the air bag from exiting the housing and instrument panel in a general upward direction further lessening impact with the windshield. As can be appreciated, the material characteristics and in particular the material characteristics of the tensioning member 430 and deflector 420 control the trajectory of the inflating airbag. Additionally, the initial tension T in the tensioning member 430 can also contribute to the control of the airbag trajectory. FIG. 14 illustrates an alternate exterior deflector 500 is constructed substantially of the tensioning member 430 which is sufficiently wide to prevent the airbag from exiting side 406 of this webbing which is located toward the front of the vehicle. Additionally this tensioning member can be formed with a molded or raised center portion 502 which will encourage the airbag to move outward along arrow 504.

Figure 15:
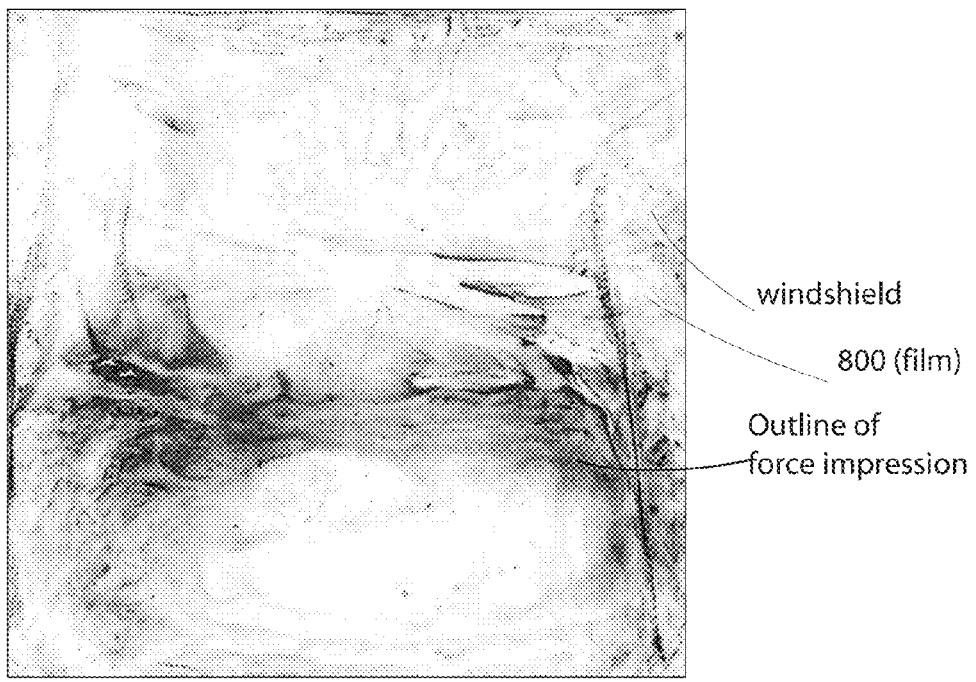
FIGS. 15 and 16 show the comparative improvement in performance created by the present invention
Figure 16:
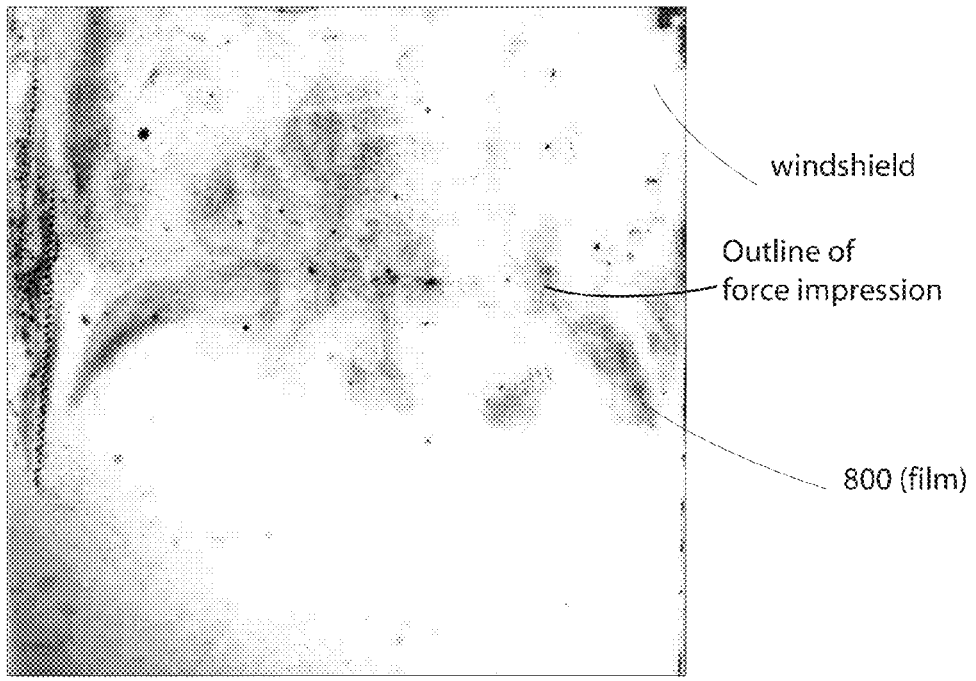

FIGS. 15 and 16 show the result of a dynamic test in which a reactive film 800 was placed upon the inside surface of the windshield. When the airbag inflated the impact of the airbag pressed against the reactive film creating an imprint or pressure profile of the forces generated by the airbag upon the inner surface of the windshield. FIG. 15 shows the performance of a base system without the external deflector. The color pattern and intensity of colors shows the force of the airbag against the windshield. The dimension X1 shows the location of the force profiles relative to the windshield. FIG. 16 illustrates the operation of the similarly sized airbag but one which is guided by the external deflector 420. As can be seen the reactive film left a substantially lower or lessened profile on the inner surface of the windshield indicating improved performance resulting from the present invention. Visually, the intensity of the force profiles upon the film are so reduced that for the purpose of printing and visualization outlines have been placed about these force profiles shown.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An airbag module (400) comprising:
  a housing (402);
  an airbag (404);
  an inflator (406);
  a deflector mechanism (420) which provides a barrier or guide and a reaction hood or surface (401) to modify the trajectory of the airbag 404 on inflation to achieve one or both of: a) to inflate at a lower trajectory, and b) lowers impact force with a windshield; and wherein the deflector mechanism (420) has a tensioning member (430) wherein the tensioning member (430) is a length of band including one of a seat belt webbing (430a), overlapping layers of the reaction hood (401), or wires or ropes, the band being secured to the reaction hood (401) wherein the respective ends (432), (434) of the tensioning member (430) is attached to the housing (402) by forming a loop (450) with an extending member or arm (452) at each end (432, 434) of the webbing (430a) and each webbing loop (450) is pulled through a hole (460) on the housing (402) on each side (436) or a horizontal lip of the housing (402).

2. The airbag module (400) of claim 1 wherein the deflector mechanism (420) has a tensioning member (430).

3. The airbag module (400) of claim 2 wherein the tensioning member (430) is a length of band including a seat belt webbing (430a) secured to the reaction hood (401).

4. The airbag module (400) of claim 2 wherein the reaction hood (401) is made of one or more layers and the tensioning member (430) is formed by overlapping layers of the reaction hood (401).

5. The airbag module of claim 2 wherein the tensioning member (430) is formed by wires or ropes secured to the reaction hood (401).

6. The airbag module (400) of claim 2 wherein the tensioning member (430) further comprises opposing ends secured to the housing (402).

7. The airbag module (400) of claim 6 wherein the tensioning member (430) is secured to the housing (402) at sides (436) of the housing (402).

8. The airbag module (400) of claim 2 wherein the reaction hood (401) partially covers the airbag (404) when folded in the housing (402) preventing the airbag (404) when deployed from moving forward of the tensioning member (430) and closer to a windshield.

9. The airbag module (400) of claim 2 wherein the tensioning member (430) is secured to a top portion of the reaction hood (401).

10. The airbag module (400) of claim 7 wherein the tensioning member (430) is secured to a top portion of the reaction hood (401).

11. An airbag module (400) comprising:
a housing (402);
an airbag (404);
an inflator (406);
a deflector mechanism (420) which provides a barrier or guide and a reaction hood or surface (401) to modify the trajectory of the airbag 404 on inflation to achieve one or both of: a) to inflate at a lower trajectory, and b) lowers impact force with a windshield; and
wherein the deflector mechanism (420) has a tensioning member (430) wherein the tensioning member (430) is a length of band including a seat belt webbing (430a) secured to the reaction hood (401) and further wherein the respective ends (432), (434) of the tensioning member (430) is attached to the housing (402) by forming a loop (450) with an extending member or arm (452) at each end (432, 434) of the webbing (430a) and each webbing loop (450) is pulled through a hole (460) on the housing (402) on each side (436) or a horizontal lip of the housing (402).

12. The airbag module (400) of claim 11 wherein the end of the webbing (430a) is folded onto itself and sewn together to form the loop (450).

13. The airbag module (400) of claim 3 wherein the housing (402) is made of a plastic material and the webbing (430a) is sewn to sides (432) of the housing (402).

14. The airbag module (400) of claim 11 wherein a pin (472) is inserted in each loop (471), causing the diameter of the loop (471) with the pin (472) in place to be wider than the hole (460) in the housing (402).

15. The airbag module (400) of claim 4 wherein the reaction hood (401) is made of a material, the material including an extension of the material which is folded back upon itself to form a number of folds to form the tensioning member (430) secured to the sides (436) of the housing (402).

16. The airbag module (400) of claim 2 wherein the tensioning member (430) is a strap (430) having a width W, the housing has an opening (W1, S1) is a distance between a rear surface or edge of the tensioning strap (430) and the rear edge of the housing opening (436, S2) is a distance between a forward edge of the tensioning strap (430) and the forward edge of the opening or mouth of the housing (402), wherein placement of the tensioning member (430) can be used to adjust the inflation trajectory.

17. The airbag module (400) of claim 16 wherein the placement of the tensioning member (430) is as follows: W=47 mm, W1=95 mm, S1=30 mm and S2=20 mm.

18. The airbag module (400) of claim 2 wherein the reaction hood (401) is affixed to the inflator (406) and the housing (402) and the tensioning member (430) and upon inflation of the airbag (404) creates a tension in the tensioning member (430) stiffening the forward edge of the reaction hood 401, the reaction hood (401) acts as a reaction surface preventing forward movement of the airbag (404) toward the lower windshield.

19. The airbag module (400) of claim 18 wherein the tensioning member (430) further prevents the airbag movement in a general upward direction to further lessen the airbag (404) impact with the windshield.

20. The airbag module (400) of claim 19 wherein the tensioning member 430 upon inflation of the airbag (404) has an initial tension T, the tension T established by the physical and material characteristics of the tensioning member (430) and deflector (420) to control the airbag trajectory.

* * * * *